US012288681B2

(12) United States Patent
Gutsol et al.

(10) Patent No.: US 12,288,681 B2
(45) Date of Patent: Apr. 29, 2025

(54) METHOD OF USING REFRACTORY METAL ARC ELECTRODES IN SULFUR-CONTAINING PLASMA GASES AND SULFUR ARC LAMP BASED ON SAME

(71) Applicant: Redshift Energy, Inc., Corpus Christi, TX (US)

(72) Inventors: Alexander Gutsol, Flourtown, PA (US); Yuriy Mirochnik, Philadelphia, PA (US)

(73) Assignee: Redshift Energy, Inc., Corpus Christi, TX (US)

( * ) Notice: Subject to any disclaimer, the term of this patent is extended or adjusted under 35 U.S.C. 154(b) by 0 days.

(21) Appl. No.: 18/408,017

(22) Filed: Jan. 9, 2024

(65) Prior Publication Data

US 2024/0153754 A1 May 9, 2024

Related U.S. Application Data

(63) Continuation-in-part of application No. 17/015,505, filed on Sep. 9, 2020, now Pat. No. 11,875,975.

(60) Provisional application No. 62/898,544, filed on Sep. 11, 2019.

(51) Int. Cl.

*H01J 61/073* (2006.01)
*H01J 61/12* (2006.01)
*H01J 61/52* (2006.01)
*H01J 61/54* (2006.01)

(52) U.S. Cl.

CPC .......... *H01J 61/0735* (2013.01); *H01J 61/12* (2013.01); *H01J 61/523* (2013.01); *H01J 61/54* (2013.01)

(58) Field of Classification Search

CPC ...... H01J 61/0735; H01J 61/12; H01J 61/523; H01J 61/54

See application file for complete search history.

(56) References Cited

U.S. PATENT DOCUMENTS

| | | | | |
|---|---|---|---|---|
| 2004/0188019 | A1 | 9/2004 | Lopes Cardozo et al. | |
| 2010/0300872 | A1 * | 12/2010 | Gutsol | C01B 17/0495 423/561.1 |
| 2016/0358751 | A1 | 12/2016 | Lee et al. | |
| 2019/0247822 | A1 | 8/2019 | Nagai et al. | |

* cited by examiner

*Primary Examiner* — Anne M Hines
*Assistant Examiner* — Jose M Diaz
(74) *Attorney, Agent, or Firm* — Bardmesser Law Group

(57) ABSTRACT

Sulfur arc lamp includes an arc chamber that has a cathode and an anode both made of refractory metals that include pure tungsten, pure molybdenum, tungsten alloy, molybdenum alloy or a composite in which tungsten is at least 90%, or a composite in which molybdenum is at least 90%; a plasma initiation gas filling the plasma chamber; power supply configured to switch on and off electric arc discharge between the cathode and anode; second chamber connected to the arc chamber for releasing sulfur vapor into the plasma arc chamber, thereby creating a sulfur-containing plasma gas when the discharge occurs, and configured to selectively remove the sulfur vapor from the sulfur-containing plasma gas when the discharge occurs, wherein the second chamber is configured to reduce a concentration of the sulfur vapor in the arc chamber below $10^{13}$ molecules per $cm^3$ before the electric arc discharge is off.

18 Claims, 12 Drawing Sheets

METHOD OF USING REFRACTORY METAL ARC ELECTRODES IN SULFUR-CONTAINING PLASMA GASES AND SULFUR ARC LAMP BASED ON SAME

CROSS REFERENCE TO RELATED APPLICATIONS

This application is a continuation in part of U.S. patent application Ser. No. 17/015,505, filed on Sep. 9, 2020, which is a non-provisional of U.S. Provisional Patent Application No. 62/898,544, filed on Sep. 11, 2019.

BACKGROUND OF THE RELATED ART

Field of the Invention

The field of the invention pertains to the use of refractory metals as electrodes in plasma devices with sulfur-containing plasma gases, particularly in arc plasmatrons for dissociation of hydrogen sulfide and in sulfur arc lamps that use such electrodes.

Description of the Related Art

Hydrogen sulfide ($H_2S$) is a byproduct of oil refinement and also comprises a significant portion of natural, associated, and bio-gas. As much as 30 percent of natural gas in the world is significantly contaminated by hydrogen sulfide. Hydrogen sulfide is poisonous to employees and explodes easily, making it extremely dangerous on oil and gas drilling and production sites. Some companies vent or burn off the $H_2S$ containing associated gas, however, its combustion produces another dangerous gas: sulfur dioxide ($SO_2$), when combined with atmospheric humidity, turns into acid rain. Burning or venting of $H_2S$ containing associated gas (very potent greenhouse gas due to high methane content) takes place due in large part to the inability of existing technologies to process the gas for transmission into the natural gas supply system (<2 ppm $H_2S$ content is a requirement for pipelines in the USA).

One of the promising approaches to $H_2S$ handling is its plasma dissociation that was initially proposed in 1980's and is still not commercialized. Due to high corrosion rates of metals in $H_2S$ at high temperatures, from the beginning, the plasma-chemical process development was focused on electrodeless plasma systems such as microwave (MW) and Radio-Frequency Inductively Coupled Plasma (RF ICP). In the recent research papers, the authors reported use of plasma systems with direct contact between electrodes and hydrogen sulfide (e.g. Nunnally, T., Gutsol, K., Rabinovich, A., Fridman, A., Starikovsky, A., Gutsol, A., Potter, R. W., "Dissociation of $H_2S$ in non-equilibrium gliding arc "tornado" discharge", International Journal of Hydrogen Energy 34 (2009); Gutsol, K., Nunnally, T., Rabinovich, A., Fridman, A., Starikovsky, A., Gutsol, A., Kemoun, A., "Plasma assisted dissociation of hydrogen sulfide" Int. J. Hydrogen Energy 37 (2012) pp. 1335-1347; Nunnally, T., Gutsol, K., Rabinovich, A., Fridman, A., Gutsol, A., "Plasma dissociation of $H_2S$ with $O_2$ addition", Int. J. Hydrogen Energy 39 (2014) pp. 12480-12489); Gutsol, K., Robinson, R., Rabinovich, A., Gutsol, A., and Fridman, A., "High conversion of hydrogen sulfide in gliding arc plasmatron", Int. J. Hydrogen Energy, 42 (2017) pp. 68-75.), however the power of the systems (and therefore the discharge currents) were very small and the authors did not discuss the issue of stability of the electrodes.

Despite recent progress in the development of industrial continuous wave (CW) MicroWave (MW) technology (first of all for food heating and defrosting), MW plasma systems of atmospheric pressure have usually very low power for potential industrial $H_2S$ dissociation. The same is true for Radio Frequency Inductive Coupled Plasma (RF ICP) systems. On the other hand, arc discharge systems are available in a very wide range of powers and can easily reach the megawatt range.

There are several known approaches to handle corrosive substances by arc plasma generators (arc plasmatrons). First, it is possible to inject the reagents into jets of plasma that can be generated by any type of electric discharge. This approach has two significant disadvantages: products become dissolved with the plasma gas and this requires the plasma gas separation from the products and the process requires higher Energy Cost or Specific Energy Requirement, SER (SER=number of kWh of electric energy required for dissociation of 1 $m^3$ of $H_2S$) because a portion of energy will stay with the plasma gas. Another approach uses a shielding gas, when cathode, for example, is covered with a flow of inert gas, and the reacting gas is injected downflow. This approach has the same disadvantages though less pronounced because consumption of the shielding gas is usually much smaller than that of the reacting gas. An additional disadvantage of this approach is a complication of the plasma generator design and operation.

Thus, there is a need in the development of electric arc-based technology for hydrogen sulfide dissociation. The goal of this invention is to find material(s) and conditions that will allow using arc discharge for hydrogen sulfide dissociation.

There are several types of plasma-generating electric discharges that are used for different purposes, including plasma chemistry and light emission. The whole variety of the discharges can be divided in three classes based on the method of electro-magnetic energy delivery to plasma: discharges with direct contact between the conducting electrodes and plasma (bare-electrode discharges: arc, gliding arc, glow discharge, corona discharge); AC discharges with electrodes that can or must be electrically insulated from plasma (dielectric barrier discharge—DBD, high frequency capacitively coupled plasma—CCP that can also be in the form of one-electrode corona); and AC electrodeless discharges that can exist without the direct contact of plasma with electrodes and other elements of construction (laser radiation induced optical discharge, microwave discharge, high frequency inductively coupled plasma—ICP, and transformer discharge).

When plasma-forming gas (plasma gas) is chemically aggressive, the electrodeless discharges have an obvious advantage because the chemically aggressive plasma can be completely insulated from contact with construction materials by a layer of a relatively cold gas. This is a reason why initially, in 1980-s and 1990-s, the R&D program on hydrogen sulfide ($H_2S$) plasma dissociation to hydrogen ($H_2$) and sulfur was based on electrodeless microwave and ICP discharges. Also, these discharges found broad application in treatment of wafers using fluorine-containing gases in microelectronic manufacturing industry. Another example of using electrodeless discharges is the development of Sulphur Plasma Lamps in the early 1990-s [en.wikipedia.org/wiki/Sulfur_lamp] that is based on microwave discharge.

The discharges with insulated electrodes found broad application in the cases where the energy density and the temperature should be limited, for example in ozone generation. Though it is possible to protect metal electrodes with chemically stable materials like quartz or ceramics, the high-intensity discharges, e.g., atmospheric pressure CCP, did not find practical application because very high temperature heat fluxes from plasma to the barrier usually results in the barrier failure, e.g., because of growth of electric conductance of the insulating material with further power density increase and barrier melting.

The bare-electrode discharges can have two types of electrodes: cold, with can have cold surface is appropriate cooling is applied, and hot ones, which must have high-temperature surface. Plasma-electrode coupling in the case of cold electrodes does not require high temperature of the electrode surface like in corona, glow, gliding arc discharges (that more correctly should be called gliding glow discharge), or arc discharge anodes. Emission of electrons from a cold cathode (or a temporal cathode in the case of AC power) is determined by a field emission or by secondary electron emission. Without special cooling, the cathode surface in the case of atmospheric pressure glow discharge with high power can reach the melting temperature (for most of electrode materials) and finally the discharge can transform to the arc discharge, where the cathode surface temperature must be high to support thermionic emission of electrons. Thermionic emission occurs when electrons are emitted from the surface of an electrical conductor (e.g., metal or graphite) due to the application of heat. When the thermal energy given to electrons overcomes the work function of the material, electrons are emitted. The temperature required for thermionic emission is typically high, in the range of 1,000 to 2,500 K for low-current emission in conventional vacuum or low-pressure electron tubes, such as television picture tubes or luminescent lamps. The temperature becomes very high, in the range of 3,000 to 4,000 K for the atmospheric or high-pressure arc discharges used for light emission or plasma chemical applications. Only a few high-temperature materials can withstand such temperatures and serve for arc cathodes, e.g., graphite and refractory metals: tungsten, molybdenum, niobium, tantalum, and rhenium.

It is known that carbon and all metals except gold form sulfides, and these sulfides are thermally not very stable and usually are electrical insulators, therefore cannot serve as cathode surface. Also, it is known that during plasma dissociation of $H_2S$, in addition to sulfur molecules $S_n$, where $n \geq 2$, in the gas phase, very reactive radicals S and SH form. This is a reason why initially, in 1980-s and 1990-s, the R&D program on hydrogen sulfide ($H_2S$) plasma dissociation to hydrogen ($H_2$) and sulfur did not consider arc discharges for this application. More recently, in 2000's, several publications and patent applications (e.g., PCT/US2010/036941) were published where the use of low-current gliding arcs and arcs was considered for the $H_2S$ plasma dissociation. However, these publications did not describe the stability of the cathodes used.

It is known that tungsten is one of the most stable metals regarding high-temperature $H_2S$ corrosion, along with molybdenum, and tantalum (Farber, M. and Ehrenberg, D. M., 1952. High-Temperature Corrosion Rates of Several Metals with Hydrogen Sulfide and Sulfur Dioxide. Journal of The Electrochemical Society, 99(10), pp. 427-434). However, the studied data were obtained not for all refractory metals and at temperatures below 1200 K, while the cathode spot temperature is usually much higher. Thus, it is known that the atmospheric pressure arc cathode spots have radii of 0.5-2 mm and emit electrons due to thermionic emission and, therefore, the spot surface temperature is about 3000-4000 K (Jüttner, B., 1997. Properties of arc cathode spots. Le Journal de Physique IV, 7(C4), pp. C4-31).

SUMMARY OF THE INVENTION

In one embodiment, it is possible to use refractory metals as cathode materials and stainless steel, or hydrogen sulfide corrosion resistant alloys (e.g., Al—Fe and Al—Cr—Fe alloys are stable in $H_2S$ up to at 500° C. (Tseitlin, K. L., Merzloukhova, L. V. and Strunkin, V. A., CORROSION OF METALS BY HYDROGEN SULFIDE AT HIGH TEMPERATURES. Zhur. Priklad. Khim., 30, 1957)), or hydrogen sulfide resistant conductive ceramics (e.g., silicon carbide (Förthmann, R. and Naoumidis, A., Hot-gas corrosion of silicon carbide materials at temperatures between 1200 and 1400° C. Materials Science and Engineering: A, 120, pp. 457-460, 1989)) for anodes of the arc plasma-chemical reactors for hydrogen sulfide dissociation. In this invention, the term refractory metals covers pure tungsten, or pure molybdenum, or pure tantalum, or pure niobium, or a tungsten alloy, or a molybdenum alloy, or tantalum alloy, or niobium alloy, or a composite in which tungsten is at least 90%, or a composite in which molybdenum is at least 90%, or a composite in which niobium is at least 90%, or a composite in which tantalum is at least 90%.

A device for hydrogen sulfide plasma dissociation, which can also be used for plasma-chemical processes with other sulfur-containing gases, e.g., COS, $CS_2$, sulfur vapors, etc., includes a plasma chemical reactor including an arc plasma generator, e.g., a plasmatron, that has a cathode and an anode; the anode having a working surface for contacting hydrogen sulfide plasma, wherein the working surface is made from a material that includes stainless steel, or hydrogen sulfide corrosion resistant alloys, or hydrogen sulfide resistant conductive ceramics, or refractory metals; the cathode having a tip for arc attachment where a cathode spot is formed, wherein the cathode tip is made from refractory metals; and a flow path configured to have an inlet for gaseous hydrogen sulfide for dissociation in plasma into hydrogen and sulfur, and an outlet for gaseous products of hydrogen sulfide plasma dissociation.

Optionally, the alloy or a composite material of the cathode tip has up to 10% of low work function elements (such as thorium, cerium, lanthanum, or zirconium). Optionally, all surfaces of the arc plasma generator that are in contact with the hydrogen sulfide are kept at temperatures above a temperature of sulfur condensation. Optionally, all surfaces of the arc plasma generator that are in contact with the hydrogen sulfide are made from 316 stainless steel, or hydrogen sulfide corrosion resistant alloys, or hydrogen sulfide resistant conductive ceramics, or refractory metals.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENTS

Reference will now be made in detail to the embodiments of the present invention, examples of which are illustrated in the accompanying drawings.

It is known that all metals except gold form sulfides. Also, it is known that during plasma dissociation of $H_2S$, in addition to sulfur molecules $S_n$, where n≥2, in the gas phase, very reactive radicals S and SH form. It is also known that sulfur is the closest element to oxygen regarding their chemical properties as oxidizers. Therefore, it was expected that metals that are not stable in oxygen, are not stable is sulfur atmosphere also.

Figure 1:
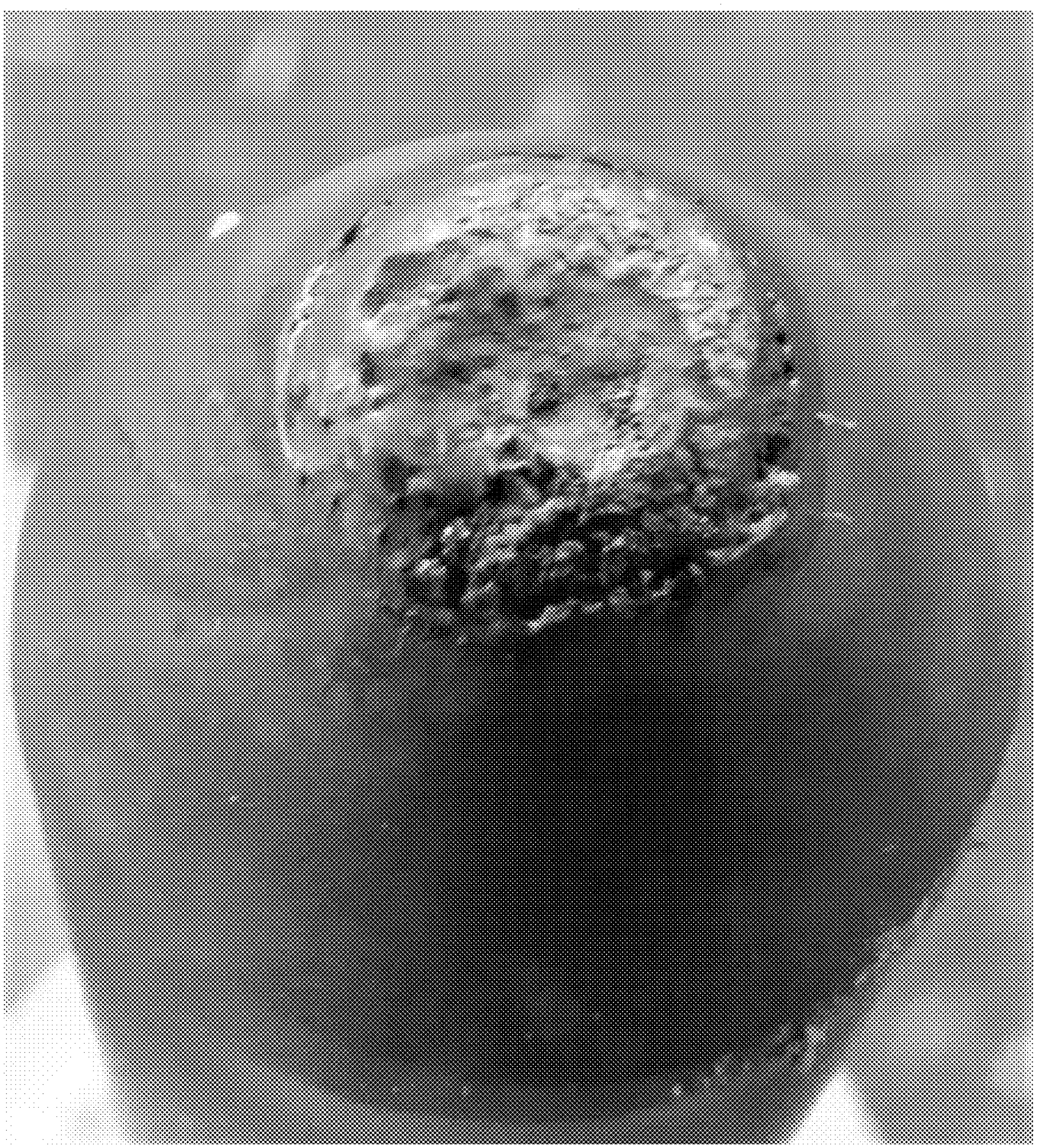
FIG. 1 shows a hafnium tip of a cathode after 10 minutes of operation in $H_2S$ at 2 A current.

In plasma arc devices that are working with oxygen-containing gases (oxygen, air, water vapor), hafnium or zirconium cathodes (so-called thermochemical cathodes) demonstrate very good and stable properties because of formation of very thermally stable electrically conductive films of their oxides or nitrides on the surface of the melted metal crater. There was a small hope that as hafnium electrodes can work with water vapor, they may also work with hydrogen sulfide. The experiment showed rather fast destruction of hafnium insert in the condition of low-current arc in $H_2S$ (FIG. 1). It is possible to see that a protective oxide/nitride film on a crater is destroyed, and surface is irregular, probably because of local bubbling out of dissolved gases (Hafnium melting temperature is 2506 K and boiling temperature is 4876 K).

Another small hope was that a tungsten cathode can survive in a hydrogen sulfide atmosphere. This hope was supported by the data that tungsten is one of the most stable metals with regard to high-temperature $H_2S$ corrosion (Farber, M. and Ehrenberg, D. M., High-Temperature Corrosion Rates of Several Metals with Hydrogen Sulfide and Sulfur Dioxide, *Journal of The Electrochemical Society,* 99 (10), pp. 427-434, 1952). However, the studied data were obtained at temperatures below 1200° K while the cathode spot temperature is usually much higher. Thus, it is known that the arc cathode spots have radii of 0.5-2 mm and emit electrons due to the thermionic emission and, therefore, the spot surface temperature is about 3000-4000° K (Jüttner, B., Properties of arc cathode spots. *Le Journal de Physique* IV, 7(C4), pp. C4-31, 1997).

Figure 2:
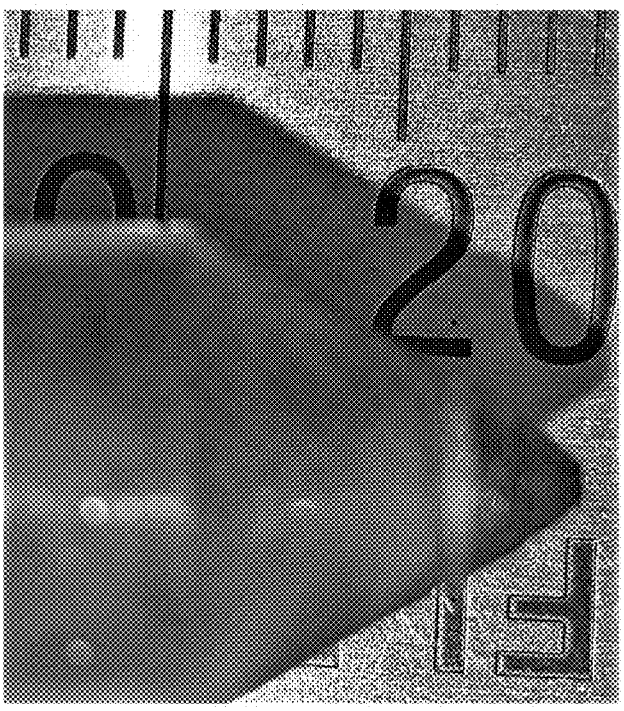
FIG. 2 shows a cathode with tungsten tip after 30 minutes of operation in hydrogen at 2 A current.
Figure 3:
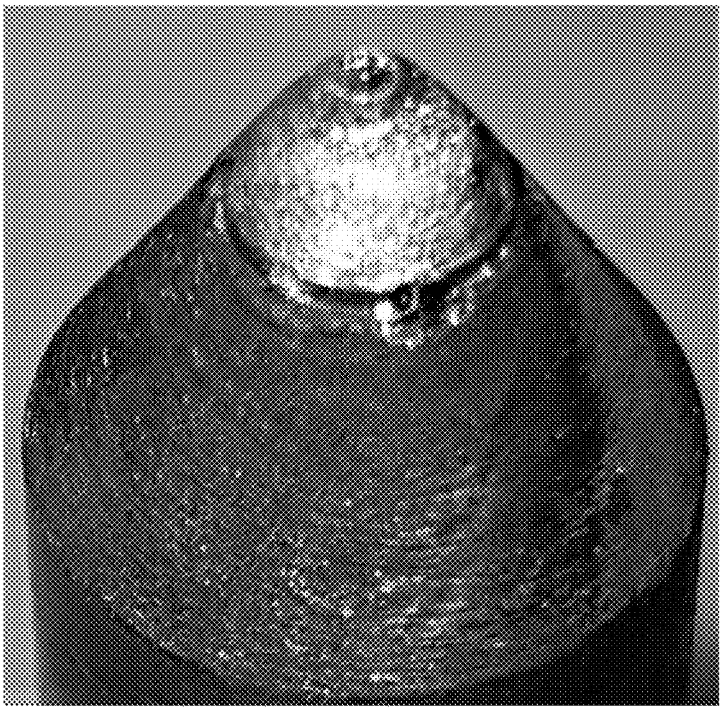
FIG. 3 shows the same cathode with tungsten tip after 30 minutes of operation in $H_2S$ at 2 A current with applying the claimed method of using refractory metal arc electrodes for sulfur-containing plasma gases.
Figure 4:
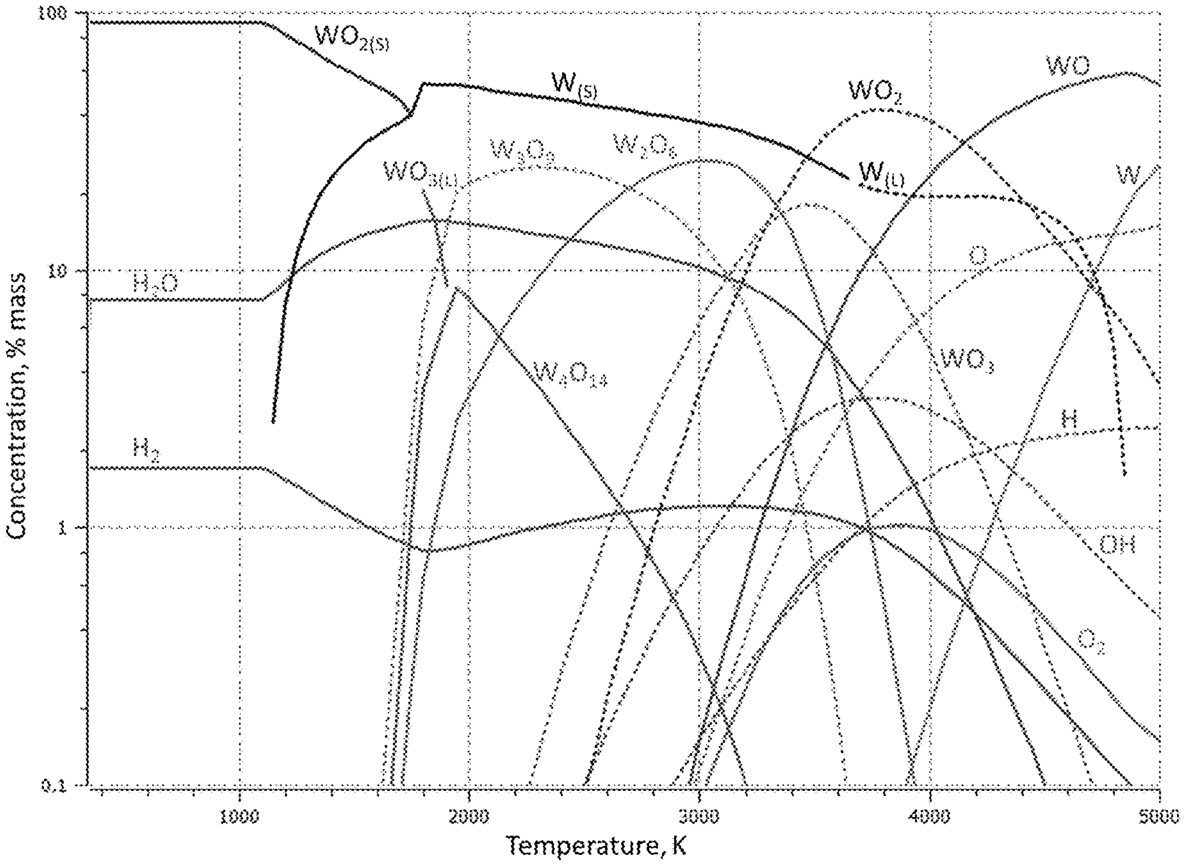
FIG. 4 shows equilibrium fractions (% mass) of substances formed from $W+3H_2O$ at 1 atmosphere.

Experiments demonstrated surprising results that appears to contradict conventional wisdom and expectations based on expert literature. FIGS. 2, 3, and 4 show a roughly 10 mm in diameter cathode, with a roughly 4.5 mm tip (at max diameter), in that example—generally, the tip can be as small as 1 mm, and as large as 10 mm, for large cathodes. Initially, the tungsten cathode was tested in hydrogen that is known to be safe for tungsten.

It is possible to see (FIG. 2) that after the sharp cathode tip became dull, there was no further substantial erosion, though the tungsten became darker than its stainless-steel holder. This result was expected.

When the same electrode was used for 30 minutes in $H_2S$ without applying the discovered method of using refractory metal arc electrodes for sulfur-containing plasma gases, a thick dark sulfide layer formed on the tungsten tip of the cathode (FIG. 8) that served for $H_2S$ plasma dissociation. It is visible that this layer is not well-attached to the metal. New plasma ignition will result in destruction of this electrically insulating layer, and this is a mechanism of fast electrode material (tungsten) deterioration.

When the same electrode was used for 30 minutes in $H_2S$ with applying the discovered method of using refractory metal arc electrodes for sulfur-containing plasma gases, no further erosion became visible, but tungsten became shiny metal-white while the stainless-steel holder became dark (FIG. 3).

An obvious contradiction between the results of these tests that contradicts conventional wisdom and the expectations based on expert literature forced the inventors to make additional studies.

Figure 5:
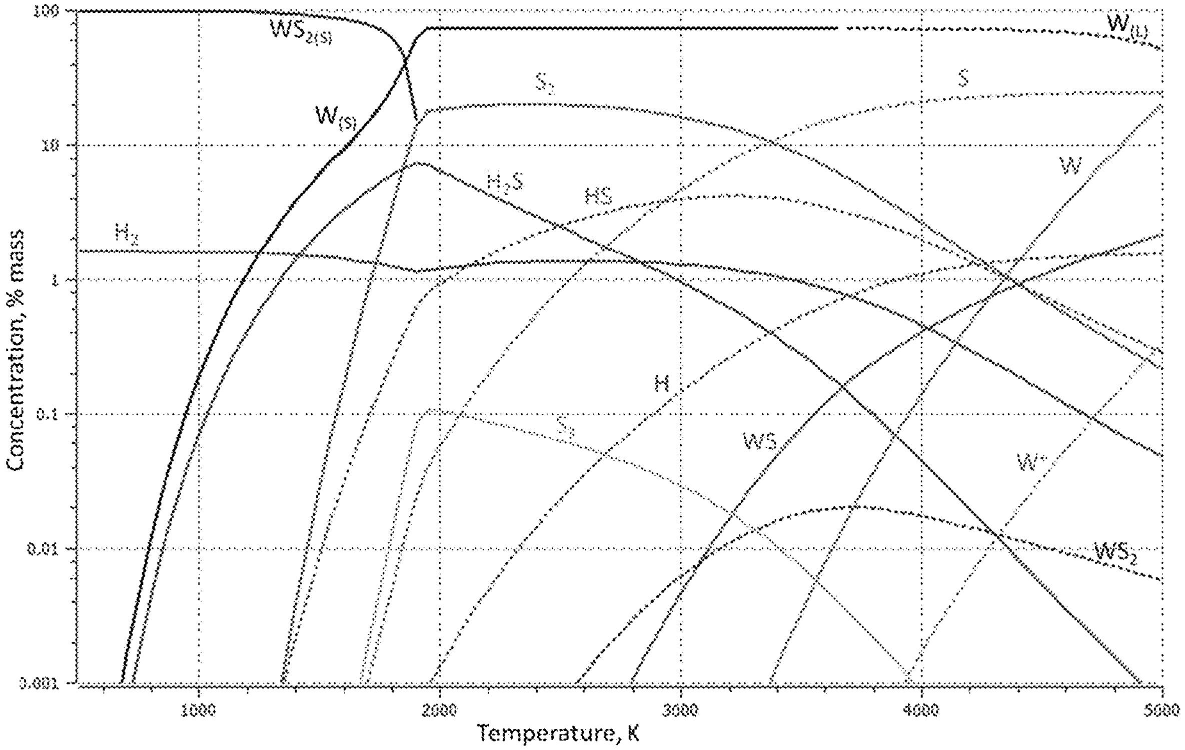
FIG. 5 shows equilibrium fractions (% mass) of substances formed from $W+2H_2S$ at 1 atmosphere.

First, to understand why tungsten can be stable with $H_2S$ arc and not stable with $H_2O$ arc, thermodynamic equilibrium simulation was made of two mixtures at 1 atmosphere: $W+3H_2O$ (FIG. 4) and $W+2H_2S$ (FIG. 5).

It is possible to see that there are fundamental differences in these two equilibrium mixtures. At low temperatures, solid tungsten is not a major component and should be converted to $WS_2$(solid) or $WO_2$(solid), but reactions are slow at these temperatures and the conversion will take a time. At high temperatures above 2000° K, solid and then liquid tungsten is the only substantial W-containing substance in $H_2S$ atmosphere (FIG. 5). On the other hand, at these high temperatures in $H_2O$ atmosphere (FIG. 4), many gaseous W-containing substances ($W_3O_9$, $W_2O_6$, $WO_3$, $WO_2$, and WO) are thermodynamically stable in high concentrations and this results in the fast chemical erosion of a tungsten electrode.

Figure 6:
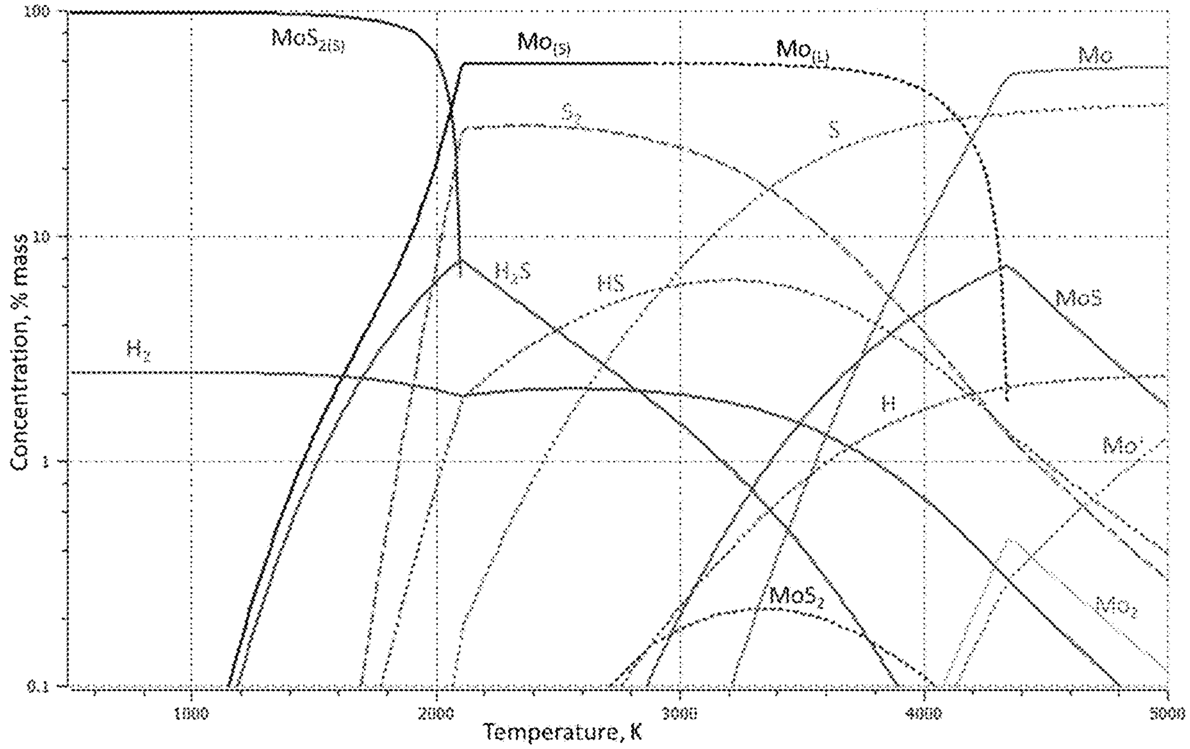
FIG. 6 shows equilibrium fractions (% mass) of substances formed from $Mo+2H_2S$ at 1 atmosphere.

Second, the inventors tested whether molybdenum that is chemically similar to tungsten can survive as a cathode in $H_2S$ atmosphere. FIG. 5 shows equilibrium fractions (% mass) of substances formed from $W+2H_2S$ at 1 atmosphere. FIG. 6 shows equilibrium fractions (% mass) of substances formed from $Mo+2H_2S$ at 1 atmosphere. Thermodynamic equilibrium simulation of the mixture Mo+2$H_2S$ (FIG. 6) shows that the similarity of molybdenum and tungsten will probably allow the use molybdenum cathodes for $H_2S$ plasma generation, however, lower melting temperature and higher vapor pressure of molybdenum in comparison with tungsten most likely makes tungsten the first choice for manufacturing of arc cathodes.

Thermodynamic simulation is a good tool to understand the major chemical stability and instability issues, however, it cannot take into account kinetics of the spatially non-uniform electrochemical processes in the cathode vicinity. Because of the thermionic emission, the concentration of electrons near the cathode tip (see FIG. 7 for illustration) is much higher than that of positive ions. FIG. 5 shows some concentration of $W^+$ that is equal to that of electrons at very high temperatures. In the vicinity of the cathode spot, the concentration of electrons will be much higher and they will effectively ionize gaseous tungsten because it has the lowest ionization potential among all substances in the mixture. Then positively charged tungsten ions $W^+$ will be attracted by strong electric field back to the cathode, and thus it will be effective vapor deposition of tungsten on the cathode surface. This is probably the reason why the tungsten cathode became shiny white in some cases after the operation in $H_2S$ atmosphere (FIG. 3).

The cathode is typically made of 316 stainless steel (see FIG. 7 for illustration), while the cathode tip can be made from refractory metals (pure tungsten, a tungsten alloy (at least 90% tungsten, the rest low work function elements, such as thorium, cerium, lanthanum, or zirconium), pure molybdenum, or an alloy of molybdenum (at least 90% molybdenum, the rest low work function elements), or a composite, such as made from powdered metals, where at least 90% are tungsten grains, the rest low work function elements or their compounds grains, or a composite in which at least 90% are molybdenum grains, the rest low work function elements or their compounds grains).

An anode made from stainless steel (SS316) demonstrated very good stability at least at low currents, and this is not surprising because it is known that SS316 is stable in $H_2S$ atmosphere at moderate temperatures (The corrosion of stainless steel began at 360° C. (Tseitlin, K. L., Merzloukhova, L. V. and Strunkin, V. A., CORROSION OF METALS BY HYDROGEN SULFIDE AT HIGH TEMPERATURES. Zhur. Priklad. Khim., 30, 1957)), and fast motion of the anode spot that can be arranged by different known ways, e.g., by gas-dynamic or magnetic rotation, can prevent overheating of the metal in the anode spot. Other anode materials can be used also, for example, it is a known practice to make anodes from the tungsten-containing composite materials. Probably, the use of copper as a standard material for arc anodes is not a good choice because of the known high rate of copper corrosion in hydrogen sulfide.

Figure 8:
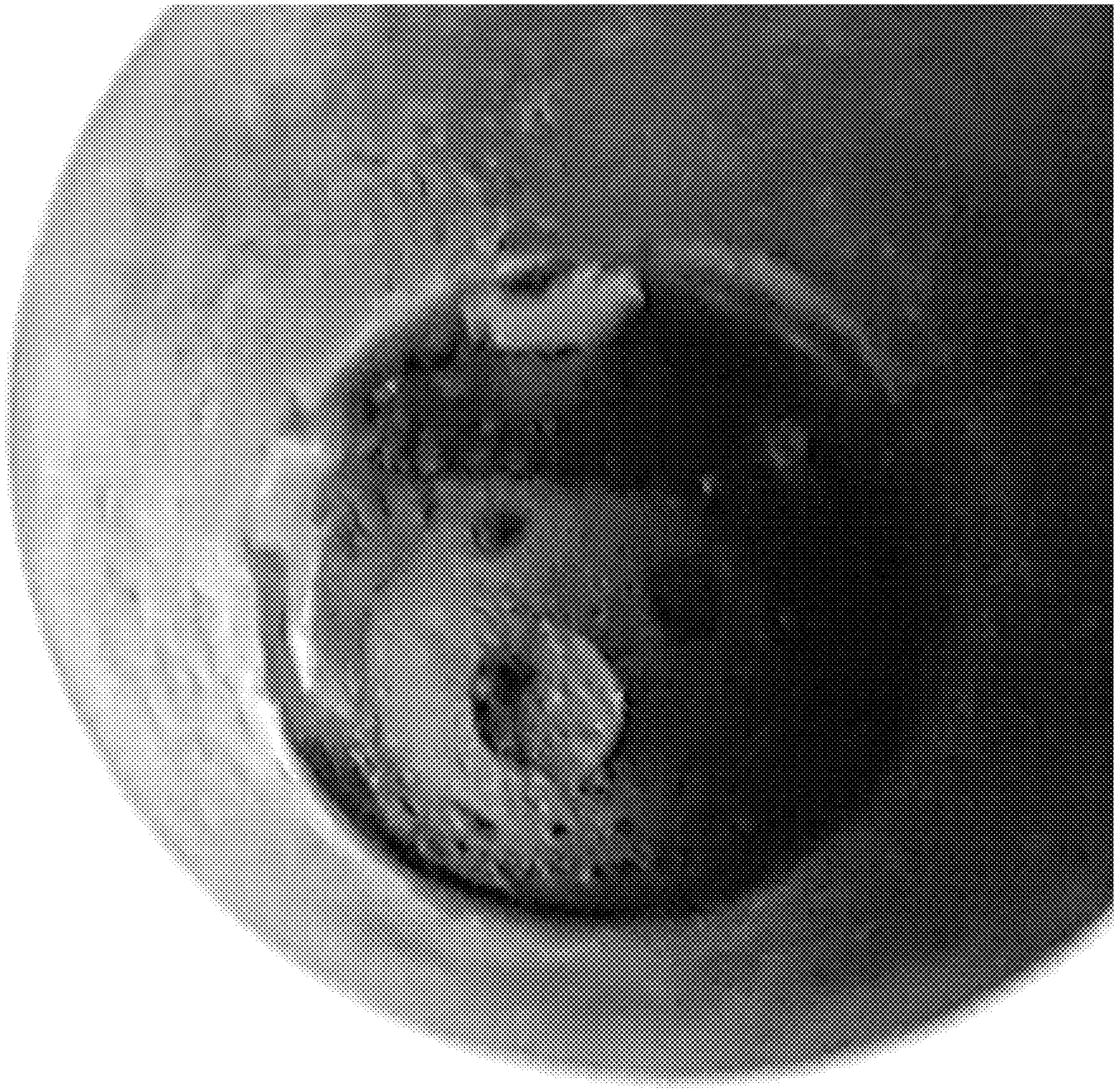
FIG. 8 shows a cathode with tungsten tip after 30 minutes of operation in $H_2S$ at 2 A current without applying the claimed method of using refractory metal arc electrodes for sulfur-containing plasma gases.

FIG. 8, contradicting FIG. 3, demonstrates formation of a thick dark sulfide layer on the tungsten tip of the cathode that served for $H_2S$ plasma dissociation. It is visible that this layer is not well-attached to the metal. New plasma ignition will result in destruction of this electrically insulating layer, and this is a mechanism of fast electrode material (tungsten) deterioration.

This is in line with the information known from the time of development of Sulphur Plasma Lamps in the early 1990-s [en.wikipedia.org/wiki/Sulfur_lamp] that bare electrodes cannot survive in sulfur atmosphere. "Because the sulfur plasma itself is exceedingly corrosive, traditional discharge lamps (which also create a plasma) with electrodes cannot be used—they would simply dissolve in use" [https://sound-au.com/lamps/sp-lamp.html]. Recently, a sulfur plasma lamp with electrodes made from silicon carbide (SiC) was patented (U.S. Ser. No. 10/297,437B2) but not commercialized. Though it is known that SiC demonstrates excellent resistance against sulfurous atmospheres at temperatures near 1400° C. (Förthmann, R. and Naoumidis, A., Hot-gas corrosion of silicon carbide materials at temperatures between 1200 and 1400° C. Materials Science and Engineering: A, 120, pp. 457-460, 1989), it is thermodynamically unstable in a sulfur atmosphere, and therefore will deteriorate when heated to high temperatures (about 3000 K) required for thermionic emission.

Thermodynamic simulations of tungsten-hydrogen sulfide mixture (FIG. 5) and molybdenum-hydrogen sulfide mixture (FIG. 6) at high temperatures show that at very high temperatures (>1950° K for tungsten and >2050° K for molybdenum), metals are thermally stable in $H_2S$ atmosphere at one atmosphere, while their sulfides are stable at lower temperatures.

These simulations brought an idea how to explain the contradictions between the test results demonstrated in FIG. 3 and FIG. 8. The sulfide layer observed in FIG. 8 can be formed after plasma was switched off, during the cooling process when the cathode temperature passed through the "corrosion" temperature range between 1200 and 1950° K. Below 1200° K tungsten sulfidation is slow (due to kinetic limitations, see Farber, M. and Ehrenberg, D. M., High-Temperature Corrosion Rates of Several Metals with Hydrogen Sulfide and Sulfur Dioxide. Journal of The Electrochemical Society, 99 (10), pp. 427-434, 1952), and above 1950° K the tungsten sulfide is thermodynamically unstable, as shown in FIG. 5. The inventors tested this idea by removing sulfur from the plasma gas before arc switching off. To reach this, we stopped the $H_2S$ flow was stopped and replaced with hydrogen flow one minute before switching of the arc. The result of this test is visible in FIG. 3. Thus, the inventors discovered a method of using refractory metal arc electrodes in sulfur-containing plasma gases: it is necessary to remove sulfur from the plasma gas before the switching off the arc.

Thus, contrary to expectations and expert literature, the inventors discovered that it is possible to use the refractory metal arc electrodes in $H_2S$ plasma gas, but it is necessary to follow a special switching-off procedure to prevent the deterioration of the cathodes.

Therefore, it is possible to make $H_2S$ dissociation and run other plasma processes with sulfur-containing gases in an arc plasma generator (plasmatron, see the illustrative FIG. 7) with a refractory metal cathode.

Figure 9:
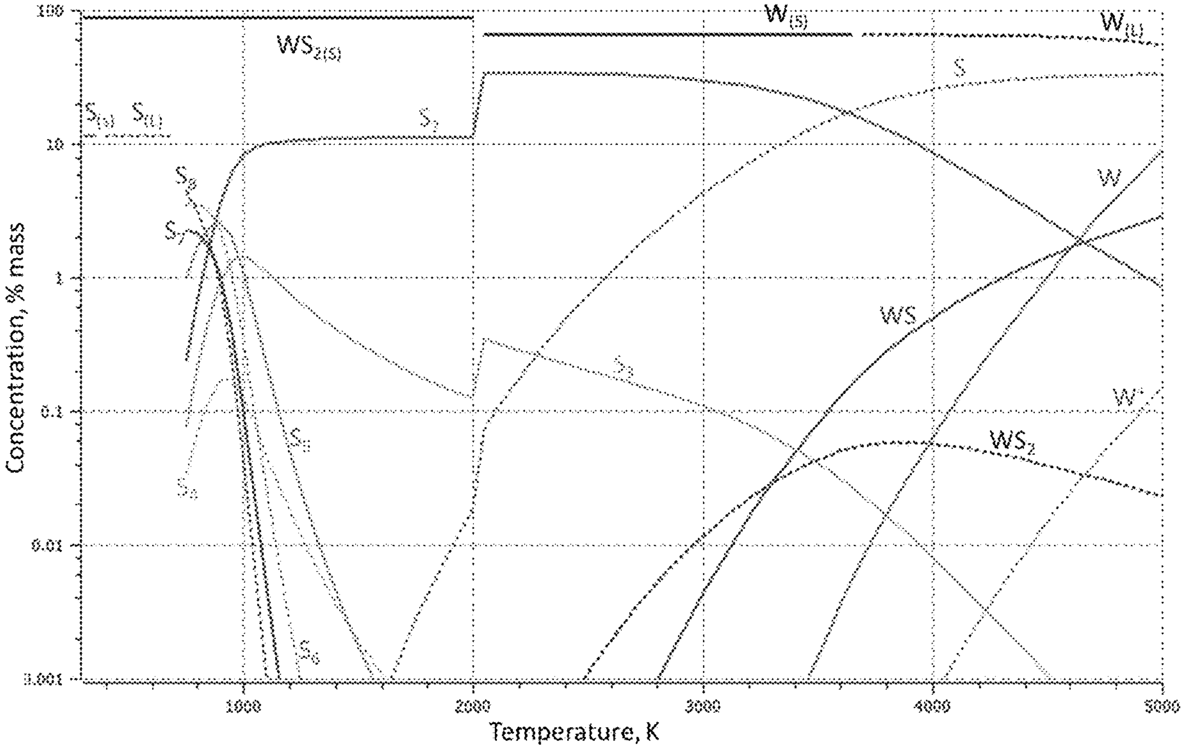
FIG. 9 shows equilibrium fractions (% mass) of substances formed from W+3S at 1 atmosphere.

Thermodynamic simulation of tungsten-sulfur mixture (FIG. 9) and comparison the results with that for tungsten-hydrogen sulfide mixture (FIG. 5) at high temperatures show that concentrations of gaseous tungsten-contained products (tungsten monosulfide (WS) has the highest concentration at temperatures close to the melting temperature of tungsten) is about the same in both cases. Therefore, our method of using refractory metal arc electrodes in sulfur-containing plasma will be applicable if the plasma gas consists mostly of sulfur vapor.

For better understanding how to pass through the "corrosion" temperature range (between 1200 and 1950° K in the case of tungsten and 1200 and 2120° K in the case of molybdenum at atmospheric pressure), the inventors conducted additional thermodynamic simulations.

Figure 10:
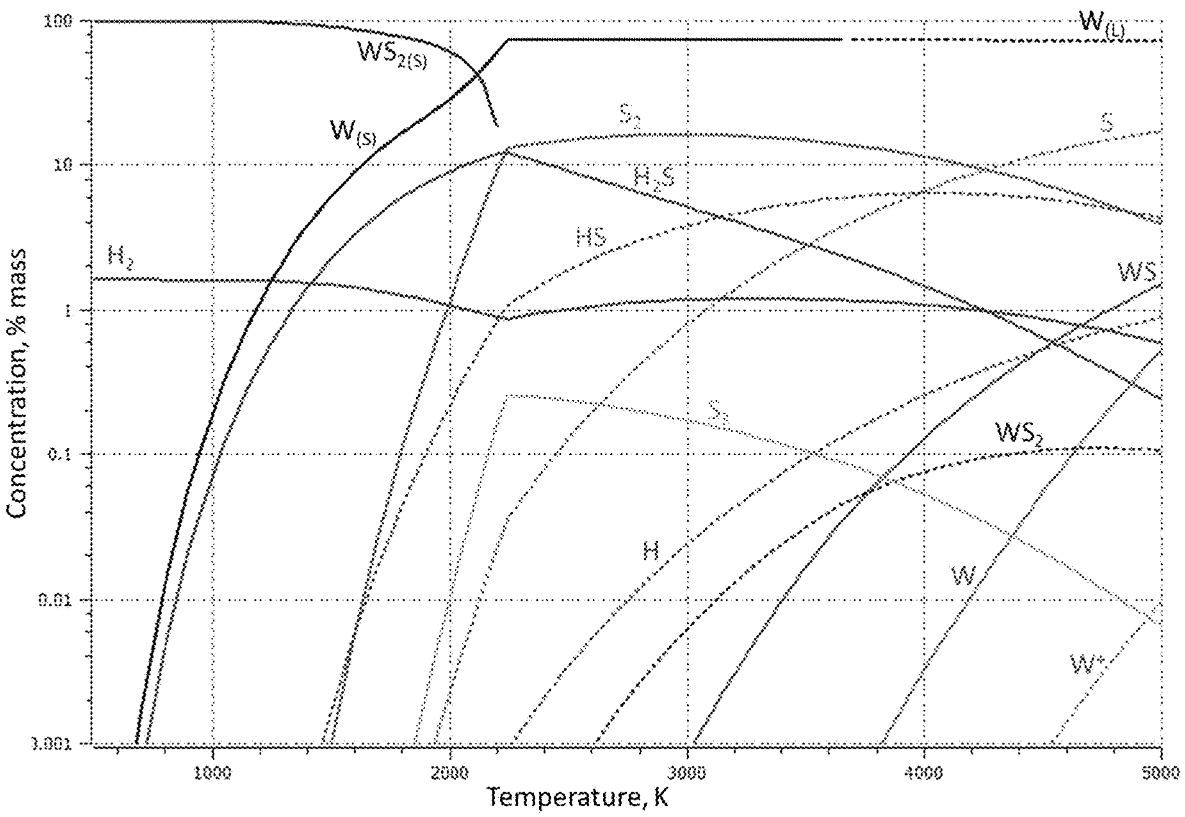
FIG. 10 shows equilibrium fractions (% mass) of substances formed from $W+2H_2S$ at 30 atmospheres.

First, the inventors tested how pressure change will affect the "corrosion" temperature range. FIG. 10 shows equilibrium (% mass) of substances formed from W+2 $H_2S$ at 30 atmospheres. It is possible to see that the pressure increase widens the "corrosion" temperature range and at 30 atmospheres tungsten disulfide is stable up to 2200 K, compared to 1950° K at atmospheric pressure.

Figure 11:
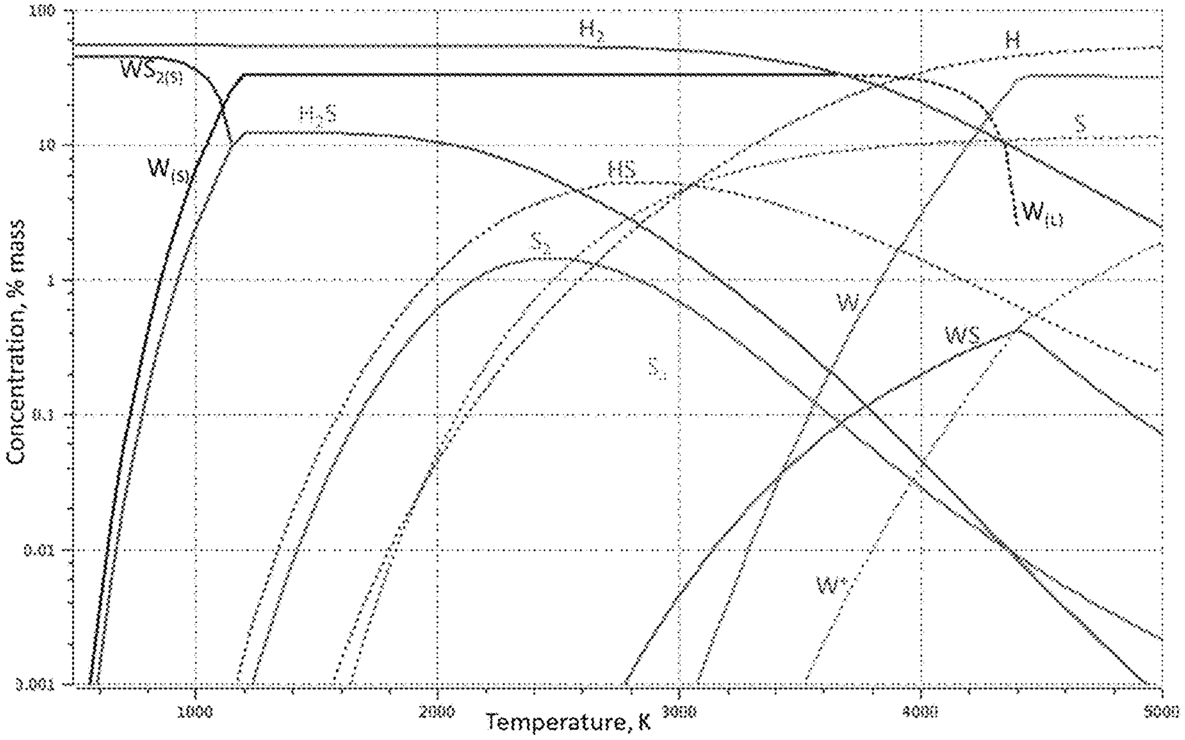
FIG. 11 shows equilibrium fractions (% mass) of substances formed from W+2 S+150 $H_2$ at 1 atmosphere.
Figure 12:
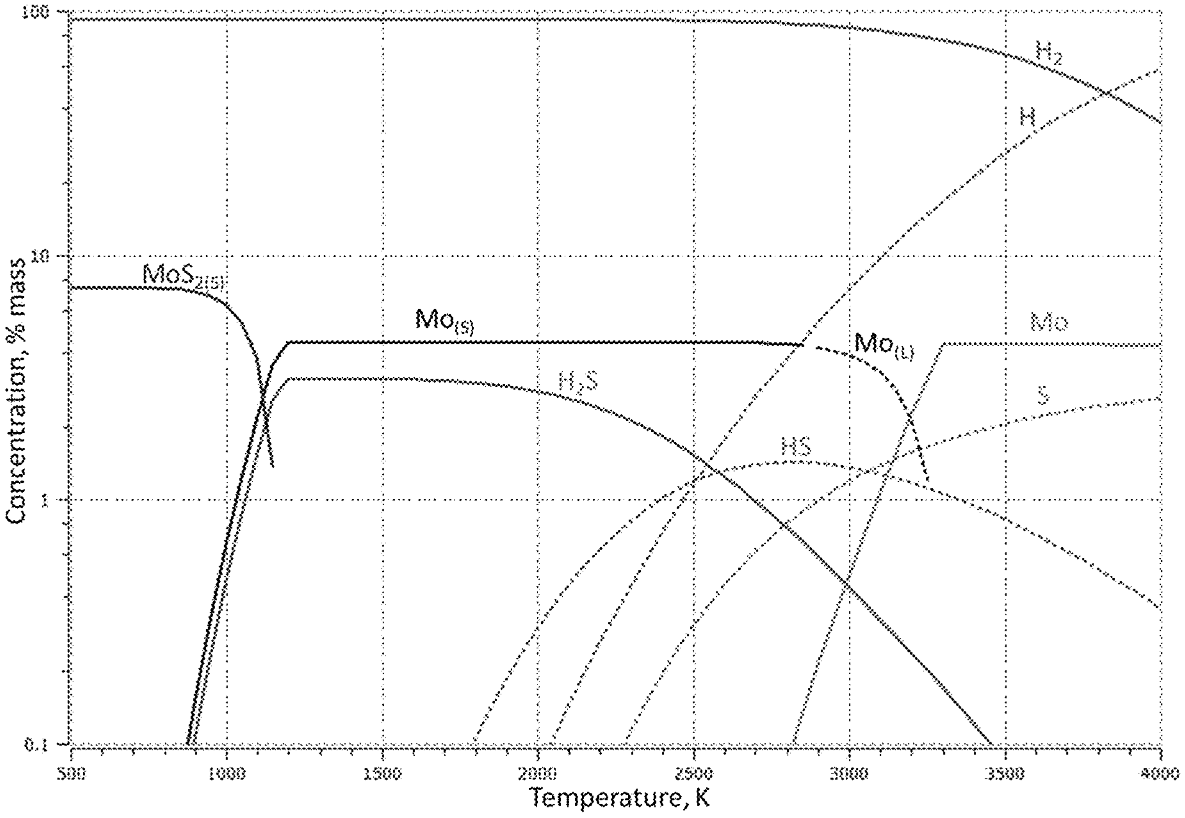
FIG. 12 shows equilibrium fractions (% mass) of substances formed from Mo+2 S+1000 $H_2$— at 1 atmosphere.

In other simulations the ratio between sulfur and hydrogen was varied. These simulations show that increase of hydrogen content in the metal-sulfur-hydrogen mixture moves the boundary of stability of the solid sulfides $WS_{2(S)}$ and $MoS_{2(S)}$ to the lower temperatures. To reduce this stability boundary temperature to the level of 1200° K when sulfidation kinetics is slow, it is necessary to have the ratio between the concentrations of hydrogen and sulfur atoms [H]/[S]=150 for the case of tungsten and 1000 in the case of molybdenum at atmospheric pressure (FIGS. 11 and 12).

Figure 7:
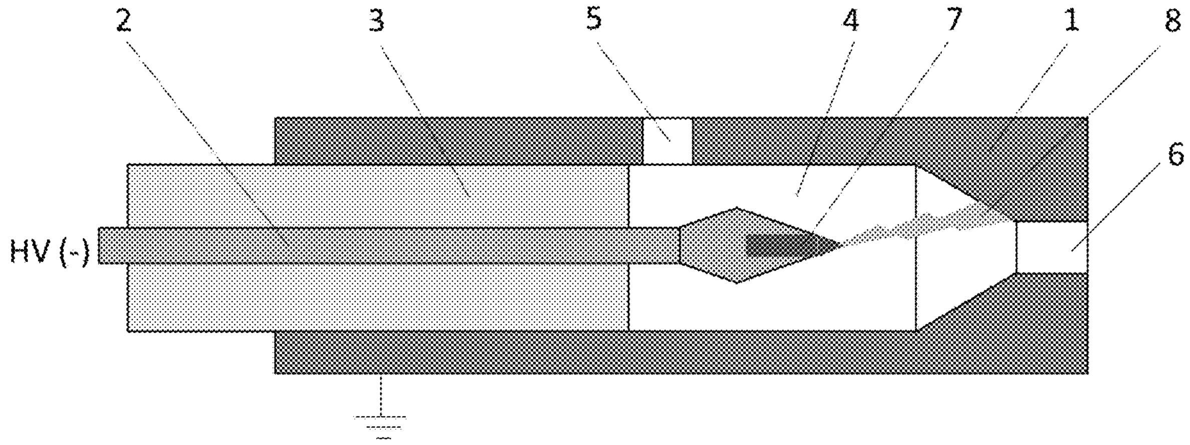
FIG. 7 shows a schematic of an exemplary plasmatron for dissociation of hydrogen sulfide.

How fast the desired [H]/[S] ratio can be reached depends on the flow conditions inside the plasmatron (see the illustrative FIG. 7). If the plasmatron designed for realization of the plug-flow conditions, hydrogen flow will replace the sulfur-containing plasma gas very fast. If the plasmatron is designed for realization of the complete mixing conditions, which assumes infinite dispersion, the process will take longer. Real reactors, as well as plasmatrons, have the flow conditions that are in between the plug-flow and the complete mixing ones, and with the absence of flow stagnation zones the longest time for "cleaning" the plasmatron from the sulfur molecules will be for the complete mixing conditions. In these conditions, a concentration N of the undesired molecules (sulfur in this case) will reduce with time exponentially $N=N_0*\exp(-(QT_2/V/T_1)*t)$, where Q is the volumetric flow rate of the "cleaning" gas (hydrogen in our case) that enters the plasmatron with temperature $T_1$, V is the internal volume of the plasmatron, $T_2$ is the average temperature of the gas that flows out of the plasmatron, and t is the time. Thus, during the time $t_1=V_{T1}/Q/T_2$, concentration of undesirable molecules will drop e=2.71828 folds. Typical parameters for our case are: V=0.1 L, Q=10 LPM, $T_1$=300° K, $T_2$=1200° K. In this case, $t_1$=0.0025 min and in one minute concentration of sulfur molecules will drop by a factor of $5*10^{123}$, which means effectively to zero. This explains why the cathode tip in FIG. 3 does not have a sulfide layer.

Very fast reduction of the sulfur molecule concentration demonstrated in the previous paragraph shows that it is possible to "clean" the plasmatron from the sulfur molecules using not only hydrogen but any gas that is inert to the cathode material, e.g., nitrogen, argon, or other noble gases, or mixtures thereof. Atmosphere can be considered clean from sulfur molecules if their concentration is below 0.1 ppm at atmospheric pressure, that corresponds to the concentration of $3*10^{16}$ molecules per $cm^3$. It is possible to calculate necessary time X (in seconds) for reducing concentration of sulfur containing molecules ($H_2S$ at $T_2$=1200° K and pressure $P_2$=1 atmosphere inside the plasmatron in our case) to the required level. $X=VT_1/Q/T_2*Ln(P_2/P_0*10^7)$, where V is liters and Q is in liters per seconds, $P_0$ is the atmospheric pressure. For our case considered above, X=2.4 seconds. (Generally, X is at least 1 second, and typically can be much longer, e.g., tens of seconds.)

Figure 13:
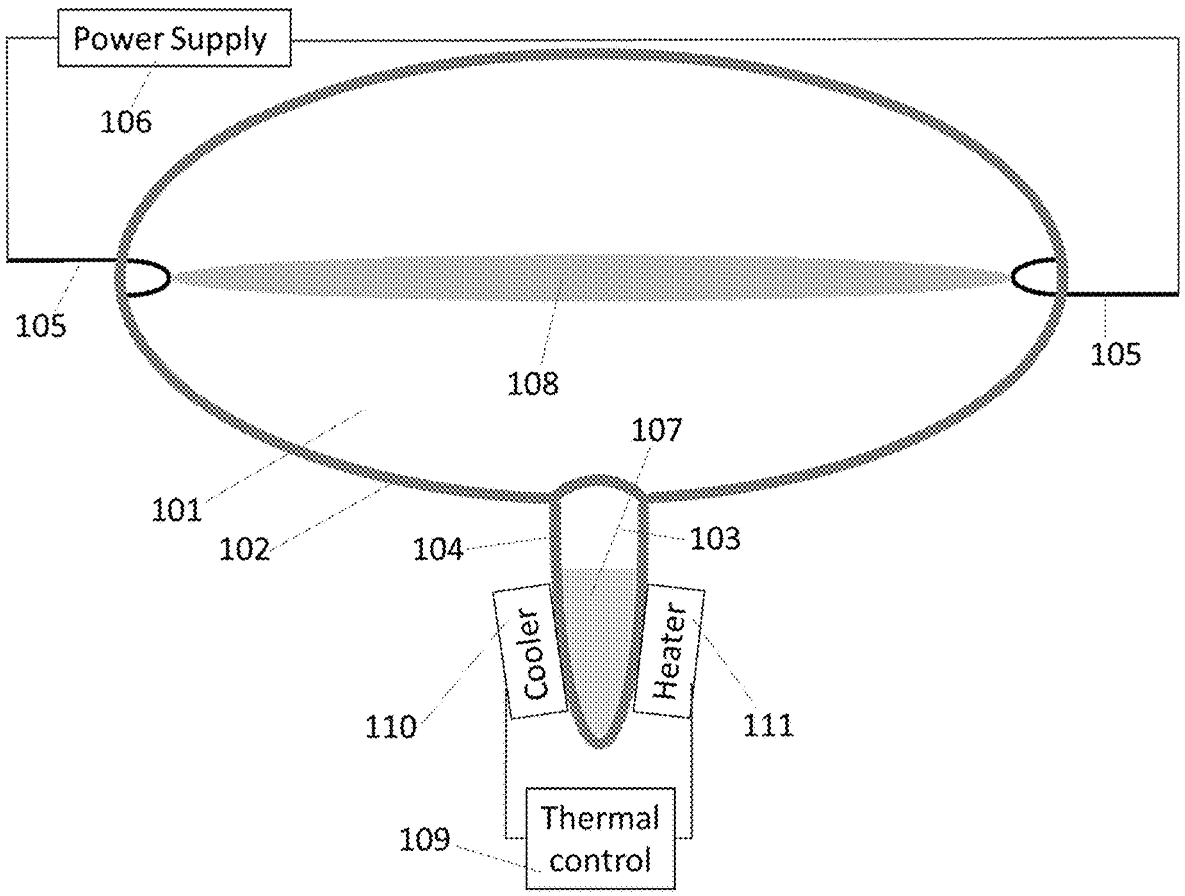
FIG. 13 shows a schematic of an arc sulfur lamp based on the method of using refractory metal arc electrodes for sulfur-containing plasma gases.

FIG. 13 illustrates one example of the invention being reduced to practice in the form of a sulfur arc lamp. As shown in the figure, the lamp includes a plasma arc chamber 101 with a transparent wall 102; a second chamber 103 with a wall 104, and the second chamber 103 is fluidly connected with the plasma arc chamber 101; two electrodes 105 that have tungsten tips for the arc attachment (formation of cathode spots), and both electrodes are connected to the AC power supply 106; elemental sulfur 107 condensed in the second chamber 103; a plasma-ignition (or plasma-initiation) hydrogen-containing gas (e.g., pure hydrogen or hydrogen-argon mixture) filled into the chamber 101; an AC arc electric discharge 108 between the electrodes 105; and a thermal control device 109 that can heat and cool the second chamber (that can be a part of the main chamber 101) using a heater 111 or a cooler 110.

When the lamp is off, the volume inside the lamp is filled with a plasma-ignition hydrogen-containing gas, e.g., argon-hydrogen mixture, and a part of the second chamber is filled with condensed sulfur. For putting the lamp into operation, the power supply 106 ignites the arc discharge 108 between the electrodes 105 inside the plasma chamber 101. The heat and radiation of the arc discharge heat, melt, and evaporate sulfur 107 in the second chamber 103. To accelerate this process, the thermal control device 109 can switch on a heater 111. Sulfur vapors mix with the plasma-ignition gas thus creating a sulfur-containing plasma gas. Arc discharge in this gas emits intense light with a spectrum like that of the sun light.

When it is time to switch the lamp off, a cycle of sulfur separation starts with cooling the secondary chamber using thermal control device 109 with a cooler 110. Removal of sulfur from the gas mixture prevents producing a layer of sulfide on the cathode tip during the electrode cooling process because of interaction of a hot metal with sulfur from the plasma gas. If a tungsten-sulfide film formed on a part of the electrodes 105 during the lamp operation as a light source, presence of hydrogen in the plasma gas will result in reduction of the tungsten-sulfide film back to hydrogen. Tungsten-sulfide film reacts with hydrogen in the gas mixture and converts into tungsten and hydrogen sulfide, then hydrogen sulfide dissociates in the arc discharge into hydrogen and sulfur, and sulfur condenses in the second chamber 103. When most of sulfur is condensed in the chamber 103 and the ratio between the numbers of hydrogen and sulfur atoms in the plasma arc chamber 101 reaches the required level (e.g., 150 at atmospheric pressure) or concentration of sulfur molecules dropped below $3*10^{16}$ molecules per $cm^3$, the power supply 106 switches off the arc 108 between the electrodes 105, and the lamp can be completely cooled, and it is ready for a new cycle of operation.

The second chamber 103 is below the plasma arc chamber during the cycle of sulfur separation, so that melted sulfur cannot flow back to the plasma chamber because of gravity.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A method of using refractory metal arc electrodes in a sulfur-containing plasma gas, the method comprising:

igniting an electric arc between an anode and a refractory metal cathode, in the sulfur-containing plasma gas, wherein the refractory metal includes pure tungsten, or pure molybdenum, or pure tantalum, or pure niobium, or a tungsten alloy, or a molybdenum alloy, or tantalum alloy, or niobium alloy, or a composite in which tungsten is at least 90%, or a composite in which molybdenum is at least 90%, or a composite in which niobium is at least 90%, or a composite in which tantalum is at least 90%, and wherein the anode is made from stainless steel, or hydrogen sulfide corrosion resistant alloys, or hydrogen sulfide resistant conductive ceramics, or a refractory metal;

maintaining the electric arc for at least one second;

prior to switching the electric arc off, removing the sulfur from the plasma gas; and switching off the electric arc in a sulfur-free plasma gas.

2. The method of claim 1, wherein the sulfur-containing plasma gas includes hydrogen sulfide.

3. The method of claim 2, further comprising dissociating the hydrogen sulfide into sulfur and hydrogen when the electric arc is switched on.

4. The method of claim 3, wherein the dissociating takes place in a continuous flow of the hydrogen sulfide.

5. The method of claim 4, wherein the removing of the sulfur from the plasma gas takes place by replacing a flow of hydrogen sulfide with a flow of hydrogen.

6. The method of claim 5, wherein the igniting takes place in a plasmatron, and the removing of the sulfur from the plasma gas takes place until a ratio of the concentrations of hydrogen and sulfur-containing molecules $[H_2]/[S]$ in the plasmatron reaches 30.

7. The method of claim 6, wherein the ratio reaches 150.

8. The method of claim 6, wherein the ratio reaches 1000.

9. The method of claim 6, wherein the removing of the sulfur from the plasma gas at atmospheric pressure takes place X seconds before switching the arc off, and X is determined as $X > VT_1/Q/T_2{*}\mathrm{Ln}(150)$, where Q is the volumetric flow rate (in liters per second) of hydrogen that enters the plasmatron with absolute temperature $T_1$, V is the internal volume of the plasmatron in liters, $T_2$ is the average absolute temperature of the gas that flows out of the plasmatron.

10. The method of claim 4, wherein the removing of the sulfur from the plasma gas takes place by replacing a flow of hydrogen sulfide with flow of a gas that is inert with respect to the refractory metal at a cathode operating temperature.

11. The method of claim 10, wherein the replacing of the flow of the hydrogen sulfide with the flow of the inert gas takes place until a concentration of sulfur-containing molecules in the plasmatron reaches a level below $3{*}10^{16}\ \mathrm{cm}^{-3}$.

12. The method of claim 10, wherein the replacing of the flow of the hydrogen sulfide with the flow of the inert gas takes place X seconds before switching the arc off, and X is determined as $X > VT_1/Q/T_2{*}\mathrm{Ln}(P_2/P_0{*}10^7)$, where V is a plasmatron internal volume in liters, Q is a volumetric flow rate of the inert gas in standard liters per second that enters the plasmatron with temperature $T_1$, $T_2$ is an average temperature of the gas that flows out of the plasmatron, $P_2$ is the pressure inside the plasmatron, and $P_0$ is the atmospheric pressure.

13. A sulfur arc lamp, comprising:

a plasma arc chamber that has a cathode and an anode;

wherein the cathode is made from refractory metals;

and wherein the anode is made from stainless steel, or hydrogen sulfide corrosion resistant alloys, or hydrogen sulfide resistant conductive ceramics, or a refractory metal;

a plasma initiation hydrogen-containing gas filling the plasma chamber, wherein a concentration of hydrogen molecules in the arc chamber is $N_{H2}$;

a power supply configured to switch on and off electric arc discharge between the cathode and anode; and a second chamber connected to the plasma arc chamber and configured to release sulfur vapor into the plasma arc chamber, thereby creating a sulfur-containing plasma gas when the electric arc discharge occurs, and configured to selectively remove the sulfur vapor from the sulfur-containing plasma gas when the electric arc discharge occurs, wherein the second chamber is configured to reduce a concentration of molecules of the sulfur vapor in the plasma arc chamber below $N_s$ before the power supply switches off the electric arc discharge, wherein $N_{H2}/N_s$ is more than 30.

14. The device of claim 13, wherein the plasma arc chamber has transparent or translucent walls and serves as a light source when the electric arc discharge is occurring in the sulfur-containing plasma gas.

15. The device of claim 13, wherein the second chamber is below the plasma arc chamber during the process of reducing the concentration of molecules of the sulfur vapor in the plasma arc chamber so that melted sulfur cannot flow back to the plasma chamber because of gravity.

16. The device of claim 13, wherein the refractory metals include pure tungsten, or pure molybdenum, or pure tantalum, or pure niobium, or a tungsten alloy, or a molybdenum alloy, or tantalum alloy, or niobium alloy, or a composite in which tungsten is at least 90%, or a composite in which molybdenum is at least 90%, or a composite in which niobium is at least 90%, or a composite in which tantalum is at least 90%.

17. The device of claim 13, further comprising a cooler configured to cool the second chamber for selectively removing the sulfur vapor from the sulfur-containing plasma gas into the second chamber when the electric arc discharge occurs.

18. The device of claim 13, further comprising a heater configured to heat sulfur in the second chamber for releasing sulfur vapor from the second chamber into the plasma arc chamber, thereby creating a sulfur-containing plasma gas when the electric arc discharge occurs.

* * * * *